2,820,654
CYLINDER PACKING MEANS

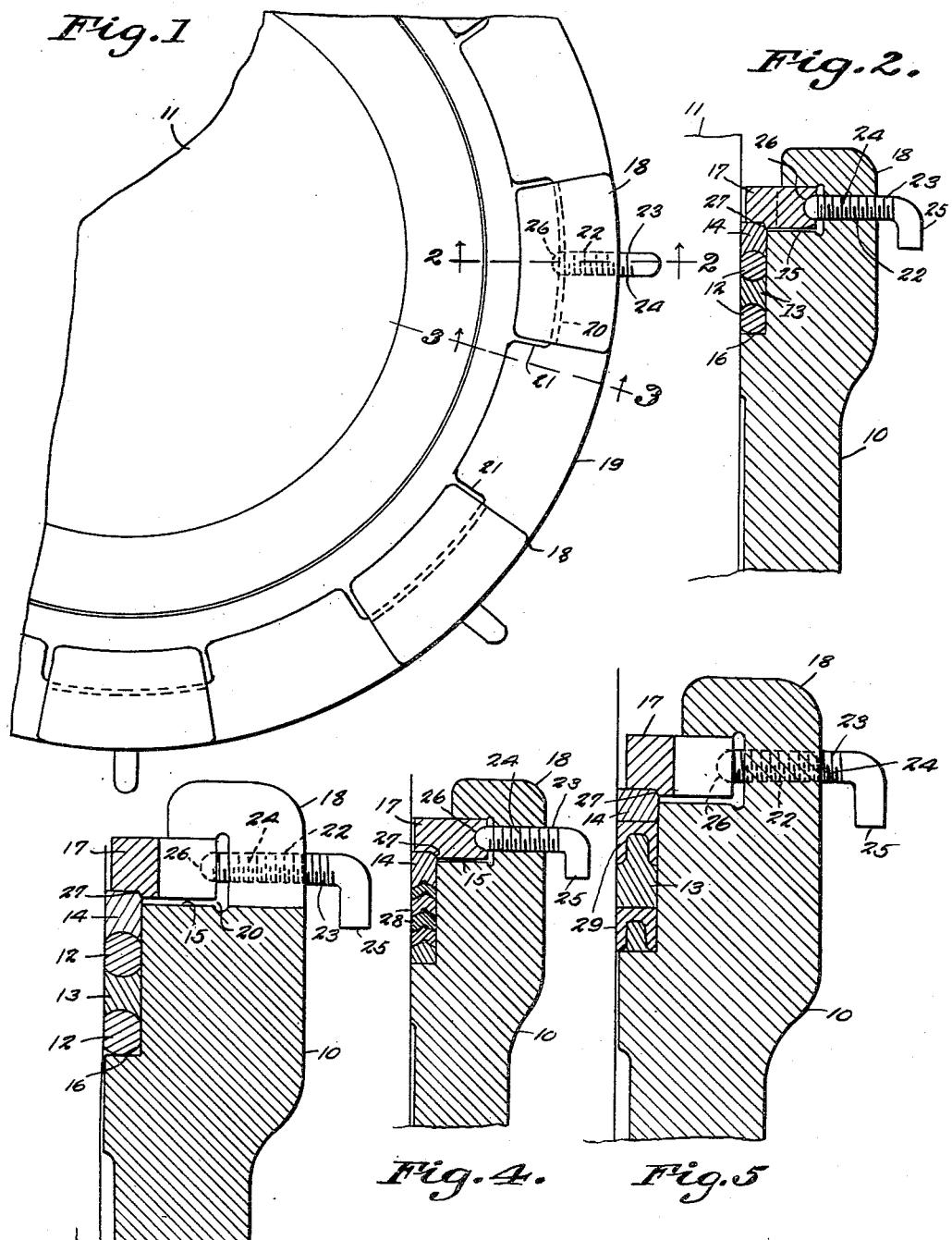

Stewart Bolling, Cleveland, Ohio, assignor to Stewart Bolling & Company, Inc., Cleveland, Ohio Application February 11, 1954, Serial No. 409,671

1 Claim. (Cl. 286—26)

This invention relates to a packing for hydraulic cylinders and the like and more particularly to a new and improved method and means for retaining a seal in the throat of the cylinder within which a piston or ram is reciprocably or slidably engaged.

It is a primary object of this invention to provide a method of packing hydraulic cylinders of the kind to be more particularly described hereinafter having a quickly and easily detachable locking ring for holding the gland rings and retainers in the cylinder for engagement with the ram therein.

It is another object of this invention to provide a packing for hydraulic cylinders of this kind with packer retainer ring locking lugs on one end of the cylinder, the cylinder and adjacent end of the lugs being bored and faced for the setting and locking of the retainer ring.

It is a further object of this invention to provide a locking ring of this kind, made of relatively soft material, for securing the packing retainers in a cylinder for easy replacement by other packing retainers as the first packers fail or are worn and other bearing deterioration due to time and excessive use.

It is yet another object of this invention to provide easily replaceable separate and distinct packers for a cylinder and ram whereby one of said packers may easily be removed and replaced upon failure, one of said packers alone adequately sealing any space between the cylinder and ram.

Other and further objects and advantages of the invention will be hereinafter described and the novel features thereof defined in the appended claim.

In the drawings:

Fig. 1 is a transverse cross section, partly broken away, of a hydraulic cylinder constructed according to an embodiment of my invention.

Fig. 2 is a fragmentary cross section taken on the line 2—2 of Fig. 1.

Fig. 3 is a fragmentary cross section taken on the line 3—3 of Fig. 1.

Fig. 4 is a fragmentary cross section of a modified form of my invention.

Fig. 5 is an enlarged fragmentary cross section of a second modified form of this invention.

Referring now more specifically to the drawings the numeral 10 designates generally a cylinder for a ram with packing between the cylinder and ram constructed and arranged according to an embodiment of my invention. The ram or piston within the cylinder is designated by the reference numeral 11 and the packing rings are shown by the reference numeral 12. The packing rings are shown, in Figs. 1 to 3 inclusive, as O ring type of packing rings separated by a separator 13.

The separator or lantern 13 spaces apart the packing rings so that the packing rings may be individually positioned for removal within the cylinder 10.

A circular retaining ring 14 holds the packing rings in their position for bearing against the outside surface of the ram or cylinder and the inside surface of the cylinder 10. The lowermost of the packing rings 12 is seated above the lower recessed upper shoulder 16 intermediate the length of the cylinder 10 adjacent the upper edge thereof.

A second upper shoulder 15 is formed on the upper end of the cylinder 10 spaced above the recessed shoulder 16 on which a locking ring 17 is to be seated for pressing against the retaining ring 14 in its position for the positioning of the packing rings 12 therebelow. At the upper end of the cylinder 10 there is formed a plurality of circumferentially spaced apart lugs 18 with a space 19 between adjacent lugs as clearly indicated in Fig. 1 of the drawings.

A groove 20 is formed in the lower end of each of the lugs 18 immediately below the upper surface of the lugs 18 on the cylinder 10. Ears 21 are formed on the outer surface of the locking ring 17 for engagement within the separate grooves in each of the lugs 18.

A bore 22 is formed in at least one of the lugs 18 and bored interiorly thereof for the reception of a lock pin 23. The lock pin 23 is formed with threads 24 on the outer sides thereof intermediate the length of the pin for threaded engagement in the threaded bore 22 of the lug within which the locking pin 23 is engaged.

The extreme outer end of the locking pin 23 is turned downwardly at right angles to the length of the locking pin, this turned down portion of the locking pin providing a handle so that the locking pin may be rotated when and as desired.

Upon rotation of the locking pin 23 in one direction the locking ring 17 will be locked in place and upon rotation of the locking pin in the other direction the locking ring 17 will be free for removal from the cylinder together with the removal of the packing rings. The inner end of the locking pin 23 is engaged within a cavity 26 on the outer surface of the lock ring 17 so that the engagement and disengagement of the locking pin 23, within the cavity 26, will effect the locking of the locking ring or release of the locking ring when it is desired to change the packing rings within the cylinder.

The packing rings 12 are adapted to be made of brass or some other soft material to prevent the hard metal to hard metal engagement of the ram and inside cylinder wall. Such a hard metal engagement often results in scoring of the ram or piston and this scoring is eliminated by the use of brass, or some other soft material, between the ram and the cylinder.

In order to provide for a secure seal between the locking ring 17 and the retaining ring 14, a beveled edge 27 is provided on each of these rings so that an adequate seal is formed between the locking ring 17 and retaining ring 14 as clearly indicated in all of the cross sectional views of the drawing.

While the above described invention has been shown with O ring packing rings it is to be understood that any and other types of packing rings may be employed between the ram and the cylinder.

In Fig. 4 of the drawings there is shown a modified form of this invention employing inverted V-shaped packing rings or chevron rings and the seating of such rings is such that a separator ring or lantern need not be used.

In Fig. 5 of the drawings there is shown another modified form of this invention wherein inverted U shaped packing rings 29 are employed and in this instance a lantern ring or separator 13 is also used as in the first form of the invention described above.

While in all of the forms of the invention shown and described herein a locking pin is shown as threaded in a bore in the lugs 18 but it is to be understood that a spring pressed locking pin may be used in its place, the spring pressed locking ring being well known in the art and not effecting the use and operation of the packing rings of this invention.

In the use and operation of the packing rings and cylinder the ram or piston 11 may be reciprocated or slid in the cylinder in the conventional normal manner and when one of the packing rings has become worn or has otherwise deteriorated the packing rings may be removed from the cylinder upon removal of the locking ring 17.

In the normal use and operation of the packing rings if one of the packing rings should become worn to the point where it should be replaced by another packing ring the one packing ring remaining will be sufficient to adequately seal the space between the ram and cylinder until such time as the lock ring can be readily and easily removed at which time the packing rings may then be replaced by other adequate packing rings preferably of the same type.

While the specific details of this invention have been herein shown and described, the invention is not confined thereto as changes and alterations may be made without departing from the scope and spirit thereof as defined in the appended claim.

I claim:

In a hydraulic cylinder and ram construction, a packing means comprising a pair of packing rings, an inner shoulder formed in said cylinder, a spacer ring, between said packing rings, said spacer ring and packing rings having correlated mating surfaces, a retaining ring bearing against the upper one of said packing rings, said retaining ring having an inner surface mating with the adjacent surface of the upper packing ring, a locking ring overlying said retaining ring, said locking ring having a concave shoulder and said retaining ring having a convex outer corner snugly seating in said concave shoulder, circumferentially spaced apart lugs carried by said locking ring, inverted L-shaped lugs carried by said cylinder having one side thereof extending inwardly and overlying said first named lugs, and a locking pin threaded through the other side of each L-shaped lug and bearing against the outer ends of said first named lugs, said first named lugs having a recess in the outer end thereof in which said locking pins engage.

References Cited in the file of this patent

UNITED STATES PATENTS

| 193,946 | Hamilton | Aug. 7, 1877 |
| 228,209 | Meier | June 1, 1880 |
| 320,939 | Longmore | June 30, 1885 |
| 695,767 | Steitz | Mar. 18, 1902 |
| 2,046,579 | Penick et al. | July 7, 1936 |
| 2,521,692 | Costello | Sept. 12, 1950 |
| 2,526,998 | Davis | Oct. 24, 1950 |

FOREIGN PATENTS

| 40,899 | Germany | Oct. 6, 1887 |
| 781,262 | France | Feb. 18, 1935 |